United States Patent [19]
McCartney

[11] Patent Number: 5,073,323
[45] Date of Patent: Dec. 17, 1991

[54] METHOD AND APPARATUS FOR PRODUCING COMPACTED PARTICULATE ARTICLES

[75] Inventor: Henry A. McCartney, Winterhaven, Fla.

[73] Assignee: Washington Mills Ceramics Corporation, North Grafton, Mass.

[21] Appl. No.: 530,631

[22] Filed: May 30, 1990

[51] Int. Cl.5 ........................................ B29B 9/06
[52] U.S. Cl. .................................... 264/118; 264/119; 264/141; 264/143; 425/237; 425/327; 425/395
[58] Field of Search ............... 264/118, 119, 141, 143; 425/237, 327, 395

[56] References Cited

U.S. PATENT DOCUMENTS

| | | | |
|---|---|---|---|
| 2,318,718 | 5/1943 | Scherer | 425/237 |
| 2,390,337 | 12/1945 | Spotz | 425/237 |
| 2,490,781 | 12/1949 | Cloud | 425/237 |
| 2,595,865 | 5/1952 | Lunsford | 425/237 |
| 2,717,419 | 9/1955 | Dickey . | |
| 2,729,855 | 1/1956 | Titus et al. . | |
| 3,300,815 | 1/1967 | Rohaus et al. . | |
| 4,261,706 | 4/1981 | Blanding et al. | 51/295 |
| 4,389,178 | 6/1983 | Komarek | 425/237 |
| 4,880,585 | 11/1989 | Klimesch et al. | 264/141 |

FOREIGN PATENT DOCUMENTS

| | | | |
|---|---|---|---|
| 166216 | 12/1980 | Japan | 264/143 |
| 202665 | 9/1986 | Japan | 425/237 |

*Primary Examiner*—Mary Lynn Theisen
*Attorney, Agent, or Firm*—Michael L. Dunn

[57] ABSTRACT

The present invention includes apparatus for and a method of producing compacted particulate articles, as well as the compacted particulate articles made by that method. A particulate material mixed with a binder is introduced to and directed through a briquetting press wherein said particulate material is first sandwiched between polymer film, the sandwich formed in resilient polymer dies, then the polymer film is peeled off of the formed articles and collected while the formed articles are collected, accumulated and further processed.

19 Claims, 4 Drawing Sheets

METHOD AND APPARATUS FOR PRODUCING COMPACTED PARTICULATE ARTICLES

FIELD OF THE INVENTION

This invention relates generally to the manufacture of compacted particulate articles and, more specifically to a method and apparatus for forming non-extrudable ceramic tumbling media such as, for example, spheres, cones, pyramids, etc.

DESCRIPTION OF THE PRIOR ART

Tumbling media are the ceramic forms that are used in secondary or finishing operations in respect to the manufacture of metal articles of production (or articles produced from various other non-metallic materials). Typically, the articles to be finished are placed into a rotatable drum which is lined with rubber or other resilient materials (for example, neoprene and urethane can be, and often are, used as drum liners). Also placed in the drum are a quantity of tumbling media forms. Sometimes, the pieces of the tumbling media are all the same in shape, form and size, but more frequently there are a variety of shapes, forms and sizes included as the tumbling media, to be used to enable each surface, each edge and each point of each production article, being finished, to come into frequent contact with at least one shape, size and form of tumbling media.

After the rotatable drum has been loaded with the articles to be finished and the tumbling media, it is closed and set in rotation, often for many hours, without stop, sometimes for days. The rotation of the drum continuously and randomly causes the articles being finished to gently come into frequent contact with the ceramic tumbling media, causing mild abrasion and impact to occur. This tends to both polish the surfaces of the articles being finished, to round off sharp corners, and to remove flash and burring which had occurred as that article was formed. The tumbling, on the other hand, tends to remove relatively small amounts of material, from the production articles being finished, in comparison to other forms of abrasive finishing. Thus size and tolerance of the articles can be more closely maintained and the uniformity of the articles, from piece to piece, is more readily controlled.

Tumbling media are made from just about any type of ceramic material which is usable for abrasive purposes, from glass frits to aluminum oxide, to silicon carbide, to diamond chips. Generally, the ceramic material is mixed with a binder, formed into a "green" shape and then fired (sintered) to the desired density and hardness. Sometimes there are naturally occurring binder/-ceramic material combinations. Some clays contain bauxite in sufficient quantities that, when the clay is formed and fired, the bauxite sinters to form high alumina ($Al_2O_3$) content tumbling media, with the moisture in the clay acting as a binder. In some cases, organic resins, waxes, starches and plastics are used as binders. In other cases simple water is sufficient as a binder. Whatever is used, the binder merely needs to function to hold the ceramic material together in its green form long enough to get it into the furnace, where the sintering takes over, either burning off the binder or including it, by sintering, into the final sintered product.

In forming the "green" shapes and forms prior to sintering, it must first be determined whether or not the shape is extrudable, i.e., can the shape be squeezed through an extrusion die on a continuous basis and cut-off to the length desired? Examples of extrudable shapes are cylindrical sections, cubes and other shapes with virtually any cross section as long as, longitudinally, they are uniform in cross section and do not need to be changed. The extrusion process is, relatively, the most economical process for producing tumbling media, because it is continuous and produces a large number of pieces in a relatively short period of time.

It has been found, however, that there are a whole variety of shapes and forms which, as tumbling media, produce desirable results, but which are not extrudable. These shapes and forms are, presently, in some cases, slip-cast. The ceramic material and binder are mixed into suspension in a liquid, usually water, and the "slurry" or "slip" so formed is poured into molds, the liquid removed, the solidified articles (castings) removed from the molds and placed in a furnace for sintering. Slip casting can form virtually any shape of tumbling media that might be desired, but it is a batch process, with several more steps involved in comparison to extrusion, thus it is slower, produces fewer number of pieces in a given period of time and is generally more costly. There are also inherent technical difficulties with slip casting such that predictability and uniformity of results are not as consistent as with extrusion.

Another method that is used to make non-extrudable parts is pressing. Here, die cavities are filled (actually slightly "overfilled") with a mixture of ceramic material and binder. Then a press ram, or plunger, is brought down to compress the mixture into the die cavities. After compression, the press ram is retracted and the formed shapes are extracted from the die cavities, placed in the furnace and sintered. The pressing method makes good products. The tumbling media so produced are high quality, consistent and can be made more dense than by other methods. The problem is that it is a relatively slow batch process, as is slip casting, thus the number of pieces produced in a given period of time is relatively small in comparison to extrusion. Also, the equipment required, including a high tonnage press, tends to be rather expensive.

In an attempt to upgrade the pressing process, from being a batch process to being a continuous process, an old method of producing particulate compacts has been contemplated and tried. A briquetting press has been used. Various methods and apparatus of producing particulate compacts, employing briquetting presses, are explained, for example, in U.S. Pat. Nos. 2,717,419; 2,729,855; 3,300,815; 4,261,709 and 4,389,178. U.S. Pat. No. 2,729,855 presents the major difficulty encountered in using briquetting presses, to wit, yield; this is explained in column No. 1 lines 30–60. The particulate matter being compacted sticks to the die cavities or pockets due to the high, but uneven, rolling pressure exerted on the forming particulate compact, combined with shear stress as the die pockets are unevenly released from the particulate compact. In other words, as the die pockets are rolled into fact-to-face alignment, the particulate material being compacted tends to be pushed in the line of least resistance, i.e., towards those sections of the die pocket which are not yet mated with their counterparts. This, likewise occurs as the two halves of the die pockets are rolled further and separated. This shear stress, of course, tends to break up what has been formed by the compacting forces. The result is that the particulate compacts tend to come apart, break up and pieces thereof are left stuck in the die pockets.

A refinement of the briquetting presses has been tried. Rather than forming the die pockets from fully rigid material, i.e., metal, as is seen in the above referenced prior art, the die pockets are formed from a stiff but semi-rigid material, i.e., a plastic material. For example, fluorinated polymers, commonly sold under the trademark TEFLON®, have been used. Also, other polymers, to wit, those sold under the trademark NYLON® have been used. These produce a great improvement because the mating faces (those points on the opposed wheels of the briquetting press) which come into contact with each other can flex to a sufficient degree to substantially relieve the shear stresses. In addition, polymers are known for their relatively excellent "mold release" characteristics in comparison to bare metal surfaces. However, yield is still not acceptable to the point of being commercially economically viable in respect to the production of tumbling media. Even though the polymers have good mold release characteristics and even though the shear stress is greatly reduced, there are still small pieces of compacted particulate which stick to the surfaces of the polymer die pockets, thus resulting in the production of less than acceptable tumbling media, which must have overall smooth surfaces to function optimally in a tumbling operation. New tumbling media with pitted or "pock-marked" surfaces tend to excessively abrade the surfaces of the articles being finished in the tumbling operation; such tumbling media also tend to break up more rapidly, adding what amounts to small, sharp abrasive particles or grains to the tumbling media in the tumbling drum. These sharp abrasive grains, likewise, tend to be much too abrasive in respect to the articles being finished by tumbling. Thus, it is deemed critical that the tumbling media being used must have overall smooth surfaces, rounded corners and no sharp or rough edges. Thus, the wear that does take place thereto produces very fine particulate of a size of about 10–20 microns which tends to polish, rather than excessively abrade, the articles being finished. Using acceptable tumbling media, the result is that there is no significant change which occurs to the dimensional tolerances of the articles being tumbled.

Yet another refinement of the briquetting press has been used in the production of tumbling media. Rather than relying on the mold release properties of the polymers used to form the die pockets, a plastic film, for example polyvinyl chloride or polyethylene, has been rolled over the die pockets before they come together to compress and compact the particulate material. As the particulate material is compacted into the die pockets, the film, being of long chain polymer composition and only about 1–2 mils thick, readily stretches and deforms to form a barrier between the polymer die pockets and the material being compacted. As might be expected, the film shows even less tendency to stick to the polymer die pockets and any residual tendency that still exists is overcome by the fact that the film strands, being continuous, can be readily pulled from the die pockets with the "perfect" pieces of tumbling media therebetween.

Now the problem becomes one of separating the film from the surfaces of the tumbling media without any of the "green" formed pieces adhering to that film. The first approach to the problem is to use a mixture of binder and ceramic material which is set up to be the most "releasable" (least sticky). What has been used is the same material mixture that is used for extrusion. In fact, to supply a continuous supply of mixture to the briquetting press, an extruder with its standard mixture has been employed, with the extruded material being fed directly to the rotating die pocket wheels of the briquetting press. Such an arrangement is generally conceptually shown in U.S. Pat. No. 4,389,178, however, most conventional extrusion equipment is arranged to horizontally produce extruded material rather than the vertical arrangement as is specifically illustrated and discussed in U.S. Pat. No. 4,389,178. Because the extrusion mixture must readily slide through the extrusion die, under force, it normally contains some type of lubricant, either as the binder, e.g., oil, resin or wax, or an addition to the binder, e.g., a stearate in combination with a polyvinyl alcohol binder. Or, for example, in the case of bauxite containing clays, the combined lubricant and binder may merely be water. The lubricant property of whatever is used in the extrusion mixture will, preferably, also tend to aid the separation of the "green" tumbling media pieces from the film after formation by the briquetting press.

Because of the relatively great flexibility of the film, combined with the "lubricant" in the extrusion mix, there is almost no shear stress imposed on the surface of the tumbling media pieces as they are being formed, thus, the surfaces thereof are maintained substantially intact. However, because the film has been quite deformed during the pressing of the green pieces by the briquetting press, to the point of completely surrounding those green pieces, there is a tendency for many of the green pieces to stick or adhere to the film following compaction. The solution, so far, has been to place a man at this point to pick off the still adherent tumbling media pieces. This, of course, means that the briquetting press operation must be run sufficiently slow enough to enable the man to both see and pick off those adherent pieces. Care must be taken in doing this because the pieces are "green" and can easily be deformed or mishandled.

Most would agree that man has a "higher calling" than being a "tumbling media piece picker". The present invention is directed at eliminating such a profession, thus enabling the speed-up of the briquetting press resulting in elimination of the costs associated with the "professional services" of the "tumbling media piece picker", combined with a higher rate of production, i.e., more pieces per given period of time. Other advantages and features of the present invention are more fully described hereinafter and are particularly pointed out in the claims.

SUMMARY OF THE INVENTION

The present invention includes a method of, and apparatus for, forming green compacted particulate articles, e.g., tumbling media. The present invention comprises directing the output, comprising a ceramic material extrusion mixture, from means for extruding such as, for example, a piston type extruder or a rotary screw type extruder, to a briquetting press. The rotatable compression or compaction wheels of that briquetting press have incorporated therein resilient polymer die pockets and polymer separators therebetween. The compression wheels are rotated in contact with each other, one clockwise and the other counter-clockwise, with the die pockets in each wheel being arranged to correspond to and exactly mate with corresponding die pockets in the other wheel. The compaction wheels are rotated by, e.g., a variable speed direct drive system or a paired spur gear system driven by a motor, both of which will be readily understood by those with skill in the art. Two strands of polymer film, a bottom layer and top layer, are continuously introduced from means to do so, e.g., from shipping cartons, rollers and guide means etc., and fed to the rotating wheels in such a manner that the output from the extruder is directed, e.g., by rollers or by a tube guide, between the two strands, forming a "sandwich" just before that combined film/strand ceramic mixture/film strand "sandwich" is fed, e.g., pushed and/or pulled between the rotating compression wheels of the briquetting press. The ceramic mixture is compressed between the two strands of polymer film, the "sandwich" taking the form of the corresponding die pockets to form compacted particulate articles. The compression wheels of the briquetting press are both arranged to rotate about a horizontal axis with the axis of one wheel being positioned vertically above the other with both axes being parallel. Thus, the "sandwich" exits the compression wheels with the immediate general path of travel of the compacted "sandwich", i.e., the flat surfaces of the polymer film, with the compacted particulate articles therebetween, being disposed to extend generally horizontally.

The "sandwich", however, is separated almost immediately upon exit from the compaction wheels, with the top film strand being diverted away from the compacted particulate articles preferably initially being pulled upwardly at a relatively shallow angle to the horizontal, e.g., about 10°-15°, with the bottom film strand also being diverted, preferably initially pulled downwardly at about the same angle from the horizontal. Those pieces, that, initially, stick to the top film strand, are aided by gravity to fall off and drop a short distance, e.g., up to about 6", onto the bottom film strand, which acts as both a cushion (shock absorber) and a conveyer to carry the green compacted particulate articles away from the compression wheels.

There are acute unequal stress in the polymer film strands, following compaction, as those film strands have been subjected to the deformation caused by forming a compacted particulate article therebetween. Beginning at one edge and moving transversally across the width of the film, first there is an unstretched, unstressed land, followed by progressively increasingly stretched and stressed section until about the center thereof and then a corresponding progressively decreasingly stretched and stressed section terminating in another unstretched, unstressed land. As the compaction is terminated, some portions of the film, i.e., those that have not had their elastic limits exceeded, tend to resiliently recede to original form, while those portions which have had those elastic limits exceeded tend to buckle. This movement of the polymer film occurs after exit from the compaction wheels and is somewhat erratic, with some portions of movement occurring in a relatively quick jerk while some portions occur relatively smoothly and slowly. This erratic movement produces discrete movement of the surface of the film which tends to loosen and dislodge those pieces which, initially, had adhered to the top film strand, provided that the film strand is under tension, resulting in the drop of most of those pieces onto the bottom film strand. Also, this erratic movement tends to terminate any adherence of the pieces initially left on the bottom film strand. If the film strand is not under tension, the discrete surface movement of the film will tend to "curl" that film, causing a greater surface area of the film to come into contact with a greater surface area of the compacted particulate article, thus actually increasing, rather than decreasing, adherence.

After being preferably initially pulled upwardly at a relatively shallow angle to the horizontal, the top film strand is then preferably sharply angled upwardly to a generally vertical direction of travel preferably at that point where the distance separating the top film strand and bottom film strand is about, e.g., 6" or more, but preferably before there is any change in the direction of travel of the bottom film strand. This sharply angled up-turn of the top film strand "peels" the film away from the remaining piece and causes virtually all of the heretofore more adherent compacted particulate articles to drop off of the top film strand to fall onto the "conveyer" of the moving bottom film strand, aided by gravity.

An approach to separating the film from the "green" compacted particulate articles, which is part of the present invention, is to "peel" the film away from the surfaces of the tumbling media pieces rather than simply pulling the film generally perpendicularly, directly off the surfaces thereof. What is meant by "peeling" is, starting at one side, edge, end, point, etc. of each piece of an article, to bend the film away from the surface of that article and to concurrently pull it such that it progressively separates away from that side, edge, end, point, etc. and across the face of the article with which it is in contact, to a point generally remote or opposite, on the article, to that point at which the peeling began. This can be done, in regard to the briquetting press set-up, by running the film around a roller which is preferably generally about the same diameter or smaller than the largest dimension of the tumbling media pieces, thus significantly redirecting the direction of travel of the film by a substantial angle, e.g., preferably approximately 90°. The compacted particulate articles, being relatively more rigid than the film, will tend to change direction of movement a relatively small amount, e.g., approximately 10°-20°, but most will fall off of the film. Optionally, the top film strand may be directed through a guide stripper which functions both to "scrape" any residual adherent articles off of the top film strand, to fall on the bottom film strand "conveyer", and to guide or direct the subsequent path of travel of the spent film.

The bottom film strand is preferably "draped" or "stretched" across a horizontal roller, whose axis of rotation is parallel to that of the compaction rolls, where its path of travel downwardly is substantially increased to, for example, about 80°-100° from the horizontal, i.e., to generally an approximately vertical direction. This horizontal roller is preferably not as wide as the bottom film strand, and the tension imposed on that film causes it to be stretched over that roller, deforming the film such that the edges thereof tend to drape downwardly over the sides of the roller. This "stretching" and "draping" again deforms the film and creates substantial peeling which further diminishes and terminates most of the adherence of the compacted particulate pieces in respect to the bottom film strand.

Up until this point, where the bottom film strand is preferably subjected to the last increase in downward travel, to a preferred approximately vertical direction, the direction of travel of both the top and bottom film strands has been preferably perpendicular to the axes of rotation of the compression wheels. Following the "draping" and "stretching" of the bottom film strand, and in addition to the increase in the degree of downward travel, the bottom film strand is twisted about 90° such that the path of travel transcends to be generally at about a right angle to that of what it was, the bottom film strand now running more generally in the vertical plane of orientation of of the compaction wheels, but not necessarily parallel thereto, but still generally perpendicular to the axes of rotation of those wheels. This preferred redirection and twisting of the bottom film strand is preferably effected by running the film over and around a second roller, disposed elevationally below the first roller, the second roller having a preferred horizontal axis of rotation but with that axis of rotation generally approximately perpendicular to that of the top roller. Due to the preferred twisting, the bottom film strand, as it runs across the second roller, tends to "bunch up", no longer appearing or being generally flat. The twisting and "bunching up" of the bottom film strand further peels that film from the compacted particulate articles, terminating virtually all vestiges of adherence of any of those articles to the bottom film strand; by gravity all are dropped into means for accumulating those articles, e.g., a tray, a bucket, a moving conveyer belt, etc. The spent film strands are accumulated to be scrapped, preferably by winding them onto spools which also function, by rotation, to apply tension to the moving film strands all the way through the process.

These and other features of the present invention will be more fully described in the following specification and claims and illustrated in the accompanying drawings.

DETAILED DESCRIPTION OF THE PREFERRED EMBODIMENT

Figure 1:
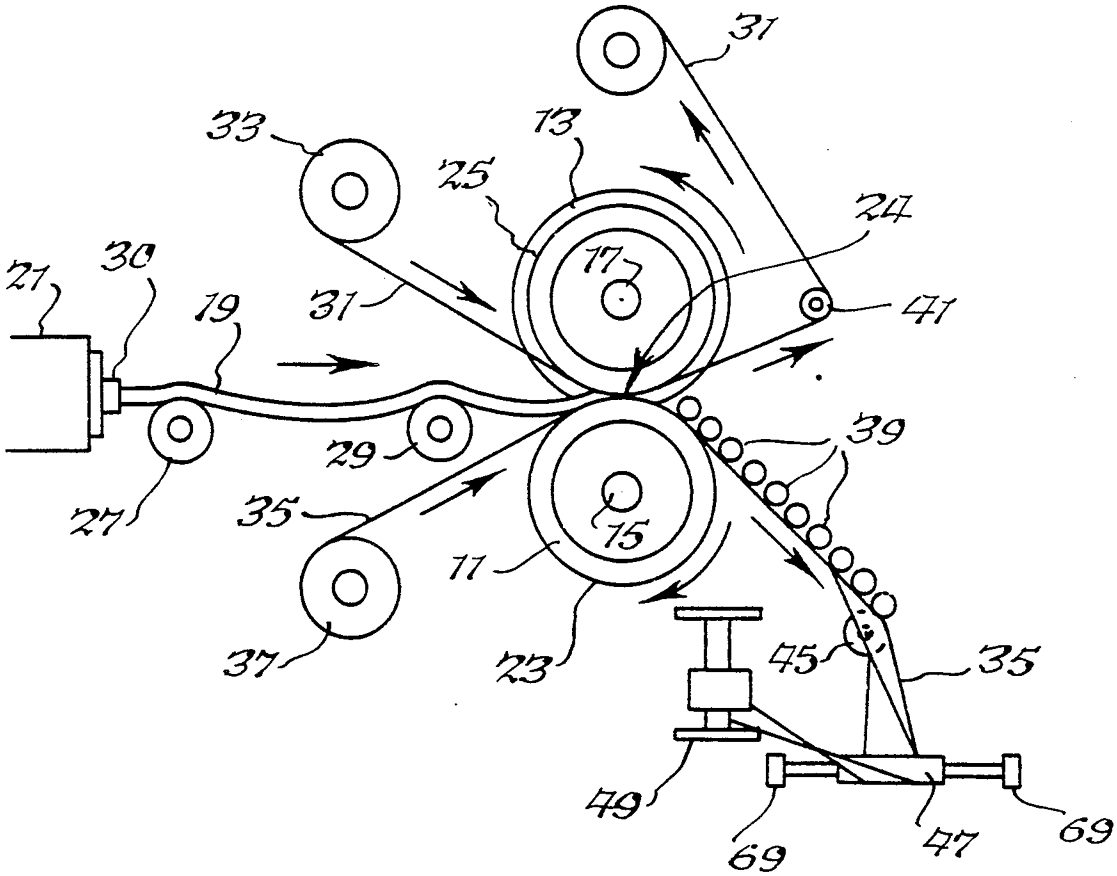
FIG. 1 is a semi-schematic side elevational view of the preferred embodiment of the system of the present invention.

Referring to FIG. 1, there is shown a male compaction wheel 11 and a female compaction wheel 13. The reason for the "male" and "female" designations will be explained hereinafter. The direction of rotation of compaction wheels 11 and 13 being indicated by arrows; to wit, as viewed in FIG. 1, compaction wheel 11 rotates in a clockwise direction and compaction wheel 13 rotates in a counter-clockwise direction. Compaction wheels 11 and 13 are rotated by axles 15 and 17, respectively, which are power driven as will be explained hereinafter. Particulate material 19 is extruded from extruder 21 and directed toward the mating surfaces 23 and 25, respectively, of compaction wheels 11 and 13, at the point where they mate 24. Extruder 21 could, for example, be a piston drive extruder or a screw drive extruder. Optionally, guide means, for example, rollers 27 and 29 or, for example a trough or a chute (not shown) can be used to direct the extruded particulate material. Alternatively, extruder 21 can be moved close to the mating point 24 of the mating surfaces 23 and 25, respectively, of compaction wheels 11 and 13 to feed extruded particulate material 19 thereto without use of such guide means. In this case, the guide means would comprise the exit port 30 of the extruder which also serves to introduce the extruded particulate material 19 to the briquetting press generally and specifically, in conjunction with, for example, rollers 27 and 29, to the mating point 24.

Top film strand 31 is fed from top polymer film roll 33 and bottom film strand 35 is fed from bottom polymer film roll 37, both top film strand 31 and bottom film strand 35 being directed toward mating point 24 of mating surfaces 23 and 25, respectively, of compaction wheels 11 and 13, as is shown in FIG. 1. Extruded particulate material 19 is interposed between top film strand 31 and bottom film strand 35, progressively, as extruded particulate material 19 approaches mating point 24. As will be more fully explained hereinafter, just prior to reaching mating point 24, top film strand 31, extruded particulate material 19 and bottom film strand 35 all come together as a "sandwich". Then a portion of extruded particulate material 19, surrounded, on top by top film strand 31 and, on bottom, by bottom film strand 35, is compacted by the mating of mating surfaces 23 and 25 to form compacted particulate articles 39.

In the preferred embodiment of the present invention, extruded particulate material 19 is extruded ceramic material and compacted particulate articles 39 are tumbling media, however, extruded particulate material 19 could alternatively, for example, be charcoal or iron ore, and compacted particulate articles 39 could respectively, be charcoal briquettes or iron ore pellets, both of which will be readily recognized by those with skill in the art. Many other particulate materials may be extruded or compacted within the scope of the present invention as, likewise, will be readily understood by those with skill in the art.

Referring to FIG. 1, as compaction wheels 11 and 13 rotate in the indicated directions, the combination of top film strand 31, compacted particulate articles 39 and bottom film strand 35, originating at about mating point 24, moves away therefrom. As will be noted in FIG. 1, the path of travel of the items fed between compaction wheels 11 and 13 is predominantly and generally from left to right, however, ultimately the path of travel of both top film strand 31 and bottom film strand 35 are significantly altered from their general left-to-right travel path.

Again referring to FIG. 1, as top film strand 31 exists the mating point 24, its path of travel is diverted somewhat upwardly from the horizontal, traveling to break roller 41 where the direction of travel is substantially altered to travel to upper collector 43 which collects or accumulates now spent top film strand 31 by, for examples, rolling it up or compacting it into a container. Preferably, upper collector 43 also functions to provide a set amount of tension to upper film strand 31 as it is moving, the tension being imposed from at least the mating point 24 to the upper collector 43. This may be done by spring loading upper collector 43 or, preferably, by power driving upper collector 43 with a friction slip clutch or slippable belt such that the power, driving upper collector 43 to roll up upper film strand 31, is overridden when the applied torque reaches a predetermined value.

Still referring to FIG. 1, as bottom film strand 35 exists the mating point 24, its path of travel is preferably diverted somewhat downwardly from the horizontal, traveling to stretch roller 45 then to twist roller 47 and then to lower collector 49. At stretch roller 45, bottom film film strand 35 is preferably substantially diverted to a path of generally downwardly and is preferably substantially twisted, with its flat cross-section being turned, for example, about 90°, preferably clockwise as shown in FIG. 1, to preferably track around twist roller 47 which preferably has a generally approximately horizontal axis of rotation, that axis which is preferably at about a right angle to the preferred horizontal axis of rotation of stretch roller 45. From twist roller 47, the path of travel of film strand 45 is again preferably substantially turned, for example, about 90°, preferably counterclockwise as shown in FIG. 1, to be collected or accumulated by lower collector 49 which, for example, functions in the same general manner as that described above for upper collector 43.

As shown in FIG. 1, lower collector 49 is in the preferred form of a spool which may be, for example, rotated under power in combination with a friction or slip clutch to impose a consistent tension on lower film strand 35. Other means for imposing such tension may be utilized such as, for example, spring loading. The tension imposed on lower film strand 35 not only serves to facilitate the accumulation or collection of spent lower film strand 35, but also serves to stretch and deform (up to and/or beyond the yield point) lower film strand 35 over stretch roller 45. The face of stretch roller 45 is preferably not as wide as the flat plane cross-section of lower film strand 35 and, thus, as lower film strand 35 is preferably stretched and deformed over stretch roller 45, the overlapping edges of lower film strand 35, under tension, are preferably pulled to "drape" downwardly over the face edges of stretch roller 45.

As extruded particulate material 19, sandwiched between top film strand 31 and bottom film strand 35, passes through mating point 24, compacted particulate articles 39 are formed, which will be more fully explained hereinafter. During the formation of compacted particulate articles 39, each of top film strand 31 and bottom film strand 35 are deformed generally to a form which resembles about one-half of each of particulate articles 39. A substantial portion of this deformation does not exceed the yield point of those film strands, thus in respect thereto, the limits of elasticity are not exceeded and, gradually, the stress relieves itself by contraction. This contraction causes discrete surface movement of those portions of both top film strand 31 and bottom film strand 35, to which green compacted particulate articles 39 tend to adhere. If longitudinal tension is concurrently applied to both top film strand 31 and bottom film strand 35, the discrete surface movement tends to significantly diminish such adherence. Those items of compacted particulate articles 39 which had initially adhered to the under surface of top film strand 31 tend to fall off thereof, by the effects of gravity brought to bear on the diminishing and diminished adherence of those items to the under surface of top film strand 31, with those items falling onto the upper surface of bottom film strand 35. Because bottom film strand 35 is a polymer film and is under longitudinal tension, it is quite resilient, thus providing a "shock absorber" or "cushion" for the fall of compacted particulate articles 39 from the underside of top film strand 31. Any residual items of compacted particulate articles 39 which continue to adhere to the under surface of top film strand 31 are dislodged as the path of travel of top film strand 31 is substantially diverted as it tracks around break roller 41. Break roller 41 is relatively small in diameter, preferably no larger in diameter than the largest dimension of compacted particulate articles 39, thus the tracking of top film strand 31 tends to effect a "peeling" of top film strand 31 away from the more rigid surfaces of the compacted particulate articles 39 which then drop onto the upper surface of bottom film strand 35, likewise being "cushioned". The placement of stretch roller 45 should be outward from the location of break roller 41, i.e., as viewed in FIG. 1, stretch roller 45 is farther to the right, in respect to the horizontal, than is break roller 41. Thus, the path of travel of bottom film strand 35 extends outwardly from the location of break roller 41, before the path of travel of bottom film strand 35 is diverted by stretch roller 45. Thus, in respect to those items of compacted particulate articles 39 which are dislodged from adherence to the under surface of top film strand 31, bottom film strand 35 function to both catch them (acting as a "shock absorber" or "cushion") and convey them along with those items of compacted particulate articles which had not initially adhered to the under surface of top film strand 31.

Predominantly, the green compacted particulate articles 39 initially adhere, to one degree or another, to the upper surface of bottom film strand 35. Like top film strand 31, bottom film strand 35 is initially in the deformed state upon exit from mating point 24. However, bottom film strand 35 is preferably subjected to relatively greater tension, imposed by lower collector 49, then is imposed upon top film 31 by upper collector 43. Thus, bottom film strand 35 is also, to a greater extent, stretched, deformed and elongated, generally in a linear direction along the path of travel thereof. This linear stretching, deformation and elongation causes additional discrete surface movement of some portions of the upper surface of bottom film strand 35 to which compacted particulate articles 39 have adhered. Thus, in bottom film strand 35 there is concurrently both a contraction of the deformation caused by the formation of the compacted particulate articles 39, and an enhanced elongation caused by greater tension imposed by lower collector 49, both of which cause discrete surface movement and both of which tend to diminish the adherence of compacted particulate articles 39 to the upper surface of bottom film strand 35.

As described above, bottom film strand 35 is pulled to "drape" downwardly over the face edges of stretch roller 45 concurrent with a diversion of the path of travel thereof to that of generally downwardly with a substantial twist of about 90° being imposed. The combination of the "draping", the downward diversion and the twist all serve to eliminate almost all of the adherence of the compacted particulate articles 39 to bottom film strand 35 by imposing discrete surface movement thereto, that surface movement resulting from the peeling effected by the "draping" and twisting, the force of gravity from the substantial downward diversion of the path of travel of bottom film strand 35 and the "peeling" as bottom film strand 35 tracks around stretch roller 45. Any residual adherence of compacted particulate articles 39 to bottom film strand 35 is eliminated by those same phenomena as bottom film strand 35 tracks around stretch roller 45, is again diverted in its direction of path of travel and is again twisted as it follows through to lower collector 49. The dislodged compacted particulate articles 39 drop into collection means (not shown) such as a bucket, tray or onto a moving conveyer belt to proceed to a calcining and/or a sintering operation (not shown).

Figure 2:
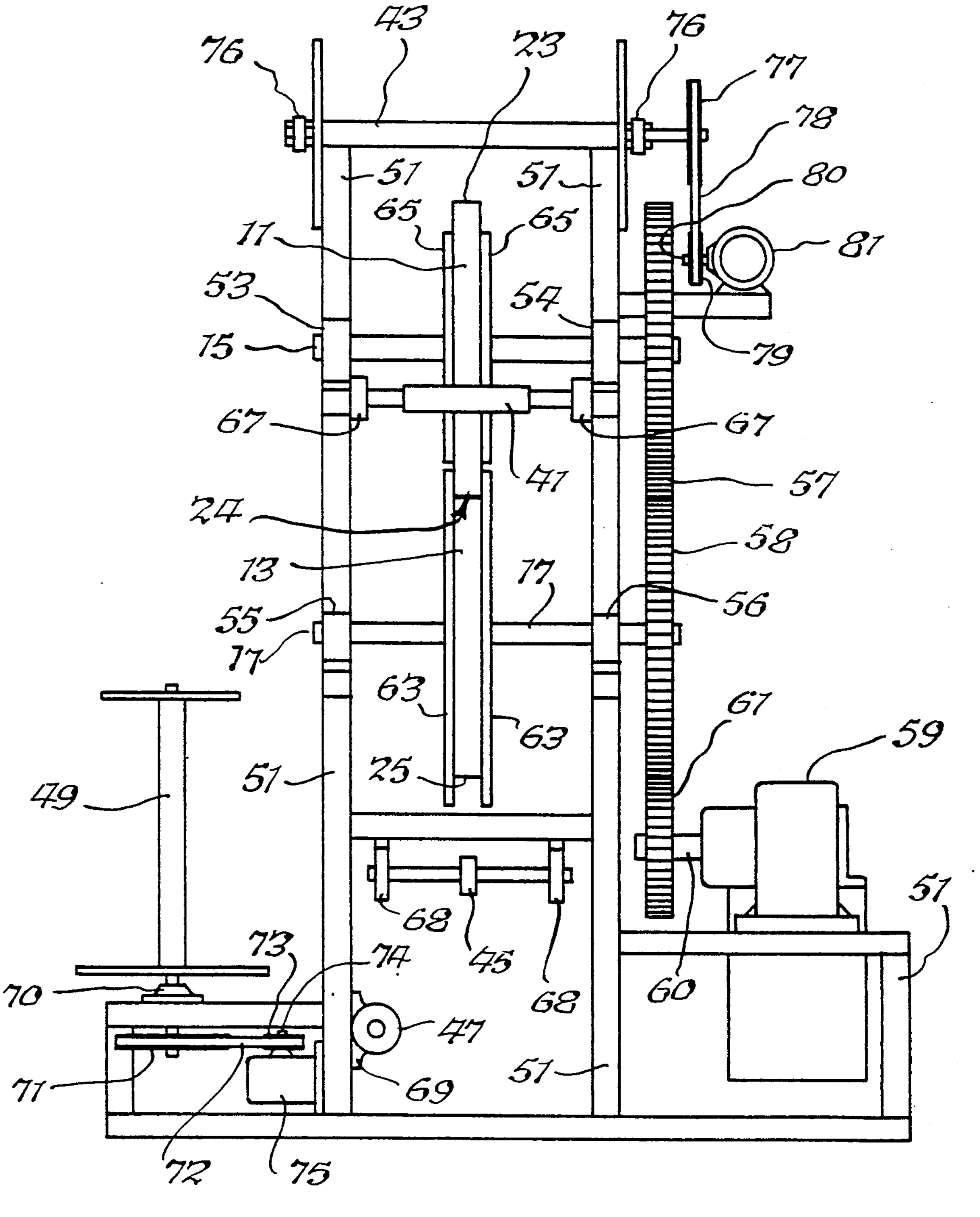
FIG. 2 is a semi-schematic cut-away elevational view of some of the elements of the preferred embodiment of the system of the present invention including the framework but without the extruder or a representation of material flow or film travel pathway.
Figure 3:
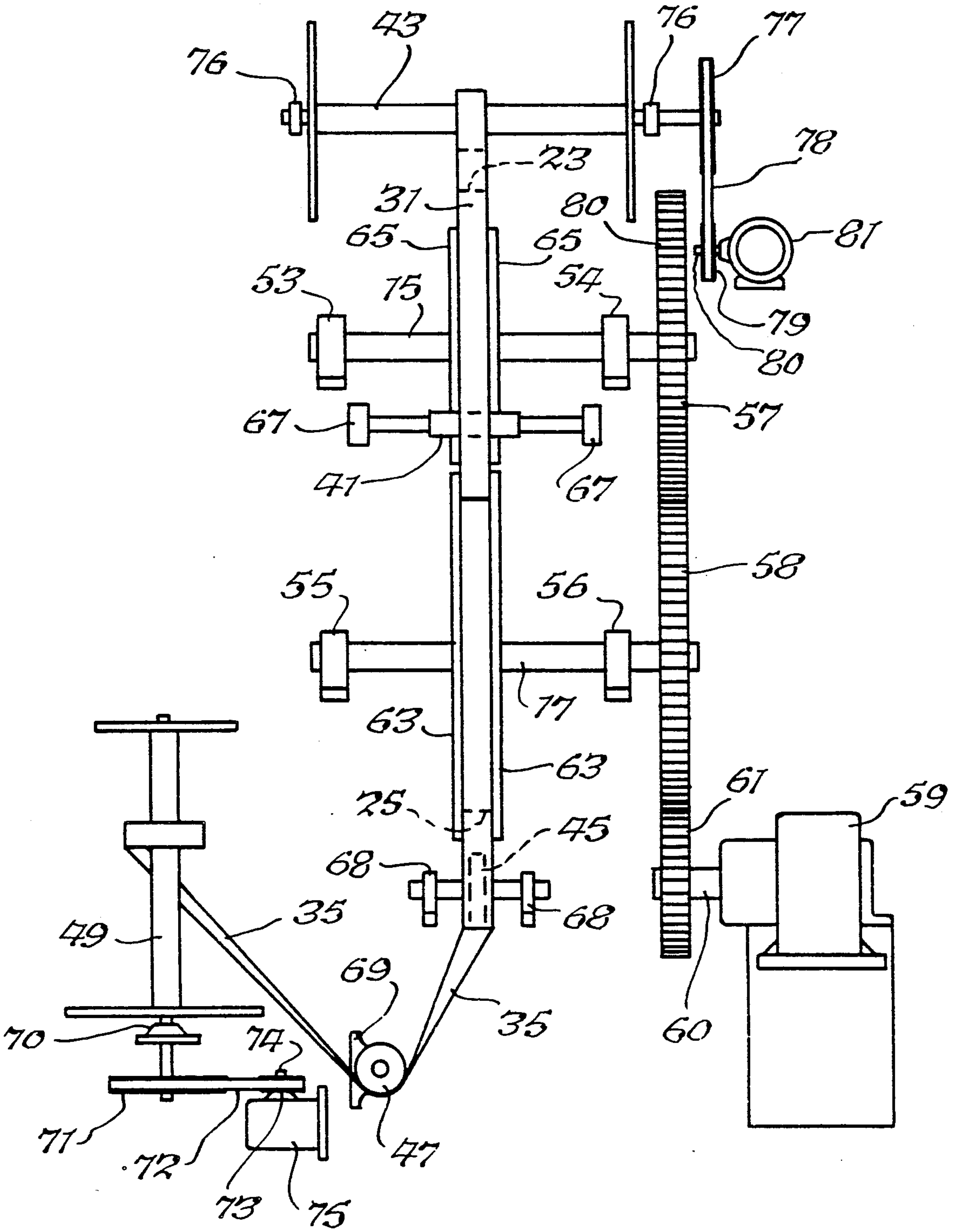
FIG. 3 is a semi-schematic front elevational view of several of the elements of the preferred embodiment of the present invention, similar to that of FIG. 2 but without the framework and, instead, showing the film travel pathway.

Referring to FIG. 2, there is shown distinct apparatus, including a frame 51, to which various other elements of the invention are mounted. As shown in FIG. 2, axle 15 is rotatably mounted in pillow block bearings 53 and 54 while axle 17 is rotatably mounted in pillow block bearings 55 and 56. Axles 15 and 17 extend outwardly, respectively, beyond pillow block bearings 54 and 56 (to the right as shown in FIG. 3). To the outward extensions of axles 15 and 17 are mounted, respectively, spur gears 57 and 58 which are sufficiently sized to engage each other such that rotation of spur gear 57 in one direction will rotate spur gear 58 in the opposite direction. Spur gear 58 is driven by gear motor 59, the output shaft 60 of which has, mounted thereto, drive gear 61 which, in turn, is rotatably engaged with spur gear 58. Other means could be, for example, used to rotate axles 15 and 17 such as, for example, a chain drive system, a friction wheel drive system, a belt drive system or a direct drive from an aligned motor or engine which could be, for example, air, hydraulic, hydrocarbon or electric powered. Whatever means are used, it is necessary that both male compaction wheel and female compaction wheel 13 be rotated such that corresponding die pockets 61, in the mating surfaces 23 and 25 of each, meet precisely to form the two halves of the form of the compacted particulate articles 39 being produced. The die pockets 61 are shown in FIG. 4 and FIG. 5 and will be further explained hereinafter.

Figure 4:
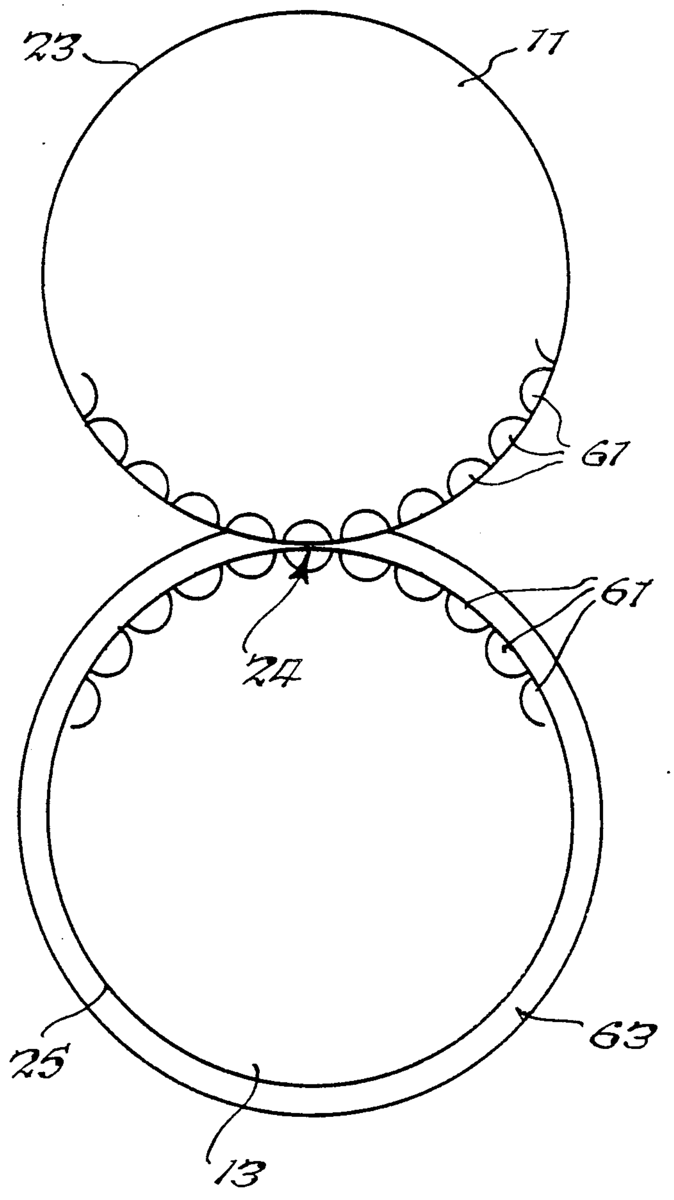
FIG. 4 is a semi-schematic side view of the relationship of the compaction wheels of the briquetting press of the preferred embodiment of the present invention.
Figure 5:
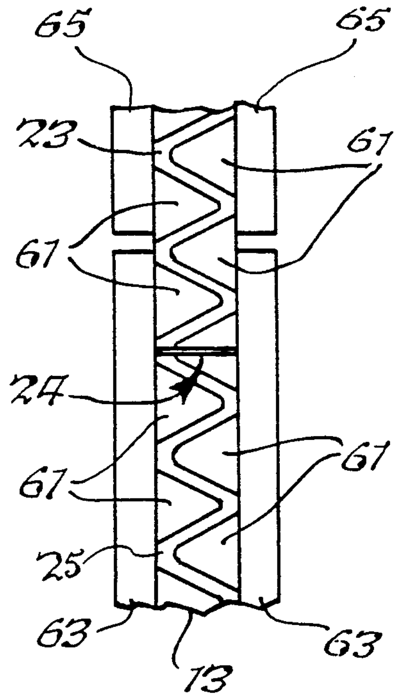
FIG. 5 is a semi-schematic enlarged section of FIG. 2 showing the detail of the mating of the compaction wheels, and the mating of the corresponding die pockets thereof, in regard to the preferred embodiment of the present invention.

In viewing female compaction wheel 13 in FIG. 2 as well as in FIG. 1, FIG. 4 and FIG. 5, it will be noted that there are a pair of flanges 63, which are larger in diameter than the diameter of mating surface 25, and which are mounted on either side of mating surface 25. Mating surface 25 extends circumferentially 360° around female compaction wheel 13 as is shown in FIG. 1 and in FIG. 4. These flanges 63 serve as support and stiffening for die pockets 61 as they are forming compacted particulate articles 39, and, in some cases, flanges 63 may function as a closure for open sections of die pockets 61 in mating surface 23, as is shown in FIG. 5.

Male compaction wheel 13 also includes a pair of flanges 65, one each of which is located on either side of mating surface 23, but they are smaller in diameter than the diameter of mating surface 23, thus permitting mating surface 23 to fit between flanges 63 and, thus, enabling direct engagement of mating surface 23 and mating surface 25 at mating point 24. The diameter of flanges 63 is sufficiently large enough to at least overlap the full depth of recess of die pockets 61 in mating surface 23 at the mating point 24 where mating surface 23 and mating surface 25 are engaged. Thus, flanges 63 overlap fully all of corresponding die pockets 61 when they are together comprising both halves of the form of compacted particulate articles 39; flanges 65, on the other hand, are sufficiently small in diameter to permit this overlapping, as is best shown in FIG. 2 and FIG. 5.

Further referring to FIG. 2, it can be seen that break roll 41, including its shaft, is mounted in bearings 67. Likewise, stretch roller 45 and its shaft are mounted in bearings 68. In FIG. 1, it can be seen that twist roller 47 and its shaft are mounted in bearings 69. One of bearings 69 is shown, likewise, in FIG. 2. Lower collector 49 with its shaft is mounted in bearing 70, with that shaft extending therethrough, to which extension is attached a pulley 71. To pulley 71 is attached V-belt 72 which also is looped around drive pulley 73 mounted on drive shaft 74 of gear motor 75. In similar manner, upper collector 43 with its shaft is mounted to bearings with one end of that shaft being extended and having mounted thereto pulley 77. To pulley 77 is attached V-belt 78 which is also looped around drive pulley 79 mounted on drive shaft 80 of gear motor 81. All of the foregoing items designated as bearings are mounted to frame 51 located about as shown in FIG. 2.

Referring to FIG. 3, an arrangement of several of the elements of the preferred embodiment of the present invention are shown in a view similar to that shown in FIG. 2, but without frame 51 being illustrated, but, on the other hand, with top film strand 31 and bottom film strand 35, and their respective travel paths, being shown from the perspective of the view presented in FIG. 3. The first twist in bottom film strand 35 is shown between stretch roller 45 and twist roller 47. The second twist in bottom film strand 35 is shown between twist roller 47 and lower collector 49. As will be noted in the preferred embodiment, there is no twist in top film strand 31, nevertheless, it is under longitudinal tension imposed by upper collector 43.

As can be inferred from FIG. 1, mating surfaces 23 and 25 are not just two-dimensional, but have some depth, including an outside diameter and an inside diameter, in effect having the form of a short cut-off section of a heavy wall tube or a square-shouldered ring. Mating surfaces 23 and 25 are preferably made of a relatively stiff, but resilient polymer material, allowing for some modest deformation under pressure, but with the capability of springing back to shape upon the release of such pressure. Acceptable polymer materials are marketed by Dupont under the trademarks TEFLON ® and NYLON ®. Other examples of functional materials are high durometer rubbers and some urethane materials as well as some grades of polyethylene. The material, however, preferably should be sufficiently stiff and should have tensile and yield strengths great enough to resist significant deformation which would produce significantly misshapen compacted particulate articles 39.

Die pockets 61 are formed as cavities recessed in the outer diameter of the mating surfaces 23 and 25, being in relief such that filling the cavity will produce one-half of the desired form and shape. As an exemplification, the die pockets 61 shown in FIG. 4 and FIG. 5 are formed to produce conically shaped tumbling media from extrudable ceramic material. Note that flanges 63 close off the die pockets 61 to form the bases of the conical shapes. As shown in FIG. 4 and FIG. 5 each die pocket 61 in mating surface 23 has a corresponding die pocket 61 in mating surface 25 such that when male and female compaction wheels 11 and 13 are rotated in opposite direction, the corresponding sets of die pockets 61 are brought into precise alignment to form the desired shape. This is not to say that mating surface 23 has to be the same outer diameter as mating surface 25, although such is preferred. For example, mating surface 23 could have an outer diameter sized to produce a circumference which is one-half the length of that of mating surface 25; by turning mating surface 23 at twice the speed of mating surface 25, the necessary effect could be created. In this case, however, each die pocket 61 in mating surface 23 would have two corresponding die pockets 61 in mating surface 25, each being 180° from the other.

It will be apparent to those skilled in the art that various modifications and variations could be made to the present invention, as described, within the scope of the principles thereof. The scope and breadth of the present invention, therefore, is not limited by the foregoing which is a statement of the best mode and preferred embodiment as is required by the U.S. Patent Laws. The following claims, however, are the definition of the present invention and of the scope and breadth thereof.

What is claimed is:

1. Apparatus for producing compacted particulate articles comprising:

a) means for extruding mixtures of particulate materials and binders;
b) means for introducing said mixtures in their extruded form to a briquetting press;
c) at least one briquetting press comprising;
   (1) a pair of compaction wheels rotatable in opposite directions, one to the other;
   (2) a plurality of die pockets formed in mating surfaces of said compaction wheels, said die pocket being numbered and arranged to correspond as said compaction wheels are rotated, said die pockets being formed from a resilient polymer material; and
   (3) means to rotate said compaction wheels;
d) means for introducing a top layer of polymer film onto said mixtures in their extruded form;
e) means for introducing a bottom layer of polymer film onto said mixtures in their extruded form, said top layer, said mixtures in their extruded form and said bottom layer, in that order, forming a sandwich;
f) means for introducing said sandwich to said corresponding die pockets as said compaction wheels are rotated to produce compacted particulate articles with both a top and bottom layer of acutely deformed polymer film thereon;
g) means for diverting said top layer upwardly, under longitudinal tension, away from said compacted particulate articles as said acute deformation of said top layer tends to return it to its original state thus producing discrete surface movement in respect to any portion of the surface of said top layer still in contact with one or more of said compacted particulate articles, the combination of said discrete surface movement and gravity, resulting from said upward drawing of said top layer, effecting a decrease in the adherence of said one or more of said compacted particulate articles still in contact with said surface of said top layer;
h) means for peeling said top layer away from said one or more of said compacted particulate articles still in contact with said surface of said top layer;
i) means for diverting said bottom layer downwardly, under longitudinal tension, as said acute deformation of said top layer tends to return to its original state thus producing discrete surface movement in respect to any portion of the surface of said bottom layer to which one or more of said compacted particulate articles adhere to, said discrete surface movement effecting a decrease in the adherence of said one or more of said compacted particulate articles;
j) Means for imposing longitudinal tension on both said top layer and said bottom layer producing discrete surface movement in respect to portions of the surfaces of both said top layer and said bottom layer in contact with said compacted particulate articles, effecting a decrease in the adherence thereof to said portions of said surfaces of both said top layer and said bottom layer;
k) Means for peeling said bottom layer away from said contact with said compacted particulate articles, said means for peeling which comprises;
   (1) means for draping said bottom layer so as to peel the edges thereof away from said compacted particulate articles;
   (2) means for substantially further diverting said bottom layer to a direction which is substantially vertical; said further diverting in combination with gravity contributing to said peeling; and
   (3) means for twisting said bottom layer effecting a peeling of said bottom layer away from said compacted particulate article.

2. The invention of claim 1 wherein said means for extruding mixtures comprise an extruder, said means for introducing said mixtures comprise guide means and said means for introducing said sandwich comprise guide means.

3. The invention of claim 1 wherein said means for introducing said top layer and said means for introducing said bottom layer comprise roller means.

4. The invention of claim 1 wherein said means for peeling said top layer and said means for diverting said top layer comprise roller means.

5. The invention of claim 1 wherein said means for peeling said bottom layer and said means for diverting said bottom layer comprise roller means.

6. The invention of claim 1 wherein said means to rotate said compaction wheels comprise an electric motor.

7. The invention of claim 1 wherein the axes of rotation of said compaction wheels are parallel and vertically positioned, one above the other.

8. The invention of claim 1 wherein said resilient polymer material is selected from the group which consists of TEFLON® polymers, NYLON® polymers, polyethylene, polyurethane and high durometer rubber.

9. The invention of claim 1 wherein said top layer and said bottom layer polymer films are selected from the group consisting of polyethylene and polyvinyl chloride.

10. The invention of claim 1 wherein said means for extruding mixtures comprise an extruder.

11. The invention of claim 1 wherein said means for introducing said mixtures comprise guide means.

12. The invention of claim 1 wherein said means for introducing said sandwich comprise guide means.

13. The invention of claim 1 wherein said means for introducing said bottom layer comprise roller means.

14. The invention of claim 1 wherein said means for introducing said top layer comprise roller means.

15. The invention of claim 1 wherein said means for diverting said top layer comprise roller means.

16. The invention of claim 1 wherein said means for diverting said bottom layer comprise roller means.

17. The invention of claim 1 wherein said means for peeling said top layer and said means for peeling said bottom layer comprise roller means.

18. A method of producing compacted particulate articles comprising:

a) extruding a mixture of particulate materials and binders;

b) introducing a top layer of polymer film onto said extruded mixture;

c) introducing a bottom layer of polymer film onto said extruded mixture, said top layer, said extruded mixture and said bottom layer, in that order, forming a sandwich;

d) introducing said sandwich to corresponding die pockets in rotating compaction wheels of a briquetting press to produce compacted particulate articles with both a top and bottom layer of acutely deformed polymer film thereon;

e) diminishing the adherence of said compacted particulate articles by producing discrete surface movement of those surfaces of said top layer and said bottom layer to which said compacted particulate articles are adherent;

f) peeling said top layer and said bottom layer away from said compacted particulate articles utilizing means for peeling.

19. Apparatus for producing compacted particulate articles comprising:

a) means for extruding a mixture of particulate materials and binders;

b) means for introducing a top layer of polymer film onto said extruded mixture;

c) means for introducing a bottom layer of polymer film onto said extruded mixture, said top layer, said extruded mixture and said bottom layer, in that order, forming a sandwich;

d) means for introducing said sandwich to corresponding die pockets in rotating compaction wheels of a briquetting press to produce compacted particulate articles with both a top and bottom layer of acutely deformed polymer film thereon;

e) means for diminishing the adherence of said compacted particulate articles by producing discrete surface movement of those surfaces of said top layer and said bottom layer to which said compacted particulate articles are adherent; and f) means for peeling said top layer and said bottom layer away from said compacted particulate articles.

* * * * *